(12) United States Patent
Hu

(10) Patent No.: US 9,194,549 B2
(45) Date of Patent: Nov. 24, 2015

(54) LIGHT EMITTING BALL STRUCTURE

(71) Applicant: Liang-Fa Hu, Taichung (TW)

(72) Inventor: Liang-Fa Hu, Taichung (TW)

(73) Assignee: Liang-Fa Hu, Taichung (TW)

(*) Notice: Subject to any disclaimer, the term of this patent is extended or adjusted under 35 U.S.C. 154(b) by 98 days.

(21) Appl. No.: 14/138,141

(22) Filed: Dec. 23, 2013

(65) Prior Publication Data

US 2015/0176784 A1  Jun. 25, 2015

(51) Int. Cl.
| | |
|---|---|
| *A63B 43/06* | (2006.01) |
| *F21S 4/00* | (2006.01) |
| *H02J 7/02* | (2006.01) |
| *H04B 5/00* | (2006.01) |
| *H05B 37/02* | (2006.01) |
| *A63F 7/40* | (2006.01) |
| *F21S 9/02* | (2006.01) |
| *F21W 131/40* | (2006.01) |

(52) U.S. Cl.
CPC .................. *F21S 4/006* (2013.01); *A63B 43/06* (2013.01); *A63F 7/40* (2013.01); *H02J 7/025* (2013.01); *H04B 5/0037* (2013.01); *H05B 37/0227* (2013.01); *H05B 37/0272* (2013.01); *F21S 9/02* (2013.01); *F21W 2131/40* (2013.01)

(58) Field of Classification Search
CPC ....................................................... A63B 43/06
USPC ............................ 473/422, 570, 604; 362/806
See application file for complete search history.

(56) References Cited

U.S. PATENT DOCUMENTS

| | | | |
|---|---|---|---|
| 5,639,076 A * | 6/1997 | Cmiel et al. ................... | 473/570 |
| 5,725,445 A * | 3/1998 | Kennedy ................ | A63B 43/06 |
| | | | 473/570 |
| 9,079,074 B2* | 7/2015 | Lindsey ................. | A63B 37/12 |
| 2013/0274040 A1* | 10/2013 | Coza et al. ..................... | 473/570 |
| 2014/0243122 A1* | 8/2014 | Crowley ....................... | 473/570 |

* cited by examiner

*Primary Examiner* — Tung X Le
(74) *Attorney, Agent, or Firm* — Yuwen Guo

(57) ABSTRACT

A light emitting ball structure is disclosed and comprises a body; a control circuit module, disposed inside the body; at least one sensor, for detecting the motion status of the body and transmit to the control circuit module for data processing; at least one light emitting module, attached on an outer surface of the body; a wireless charge transmitting module, disposed outside the body and actuating a charging operation of a wireless charge receiving module; a rechargeable battery, electrically connected to the control circuit module, the charging operation between the wireless charge transmitting module and the wireless charge receiving module is actuating to charge; a remote control receiving module, electrically connected to the control circuit module and disposed inside the body; and a remote control transmitting module, disposed outside the body and remote controlling the remote control receiving module to process a switch ON/OFF operation.

7 Claims, 5 Drawing Sheets

LIGHT EMITTING BALL STRUCTURE

FIELD OF THE INVENTION

The present invention relates to sports training, and more particularly to a light emitting ball structure for sports training and being used at night.

BACKGROUND OF THE INVENTION

The exercise is the most important for humans. In order to develop the limitation of potential energy, it should be studying continuously and trained and guided correctly.

Recently, Kinesiology has been developed to have the best performance. But after the sportsman attacks the sport goods (such as football), the Coach and/or sportsman cannot see or know its track, placement, distance, and etc. It is still hard to improve the abilities of the sportsman.

SUMMARY OF THE INVENTION

An objective of this invention is providing a light emitting ball structure. The Coach may control the remote control receiving module through the remote control transmitting module to actuate the control circuit module. After a sportsman attacks the body of the light emitting ball structure, the path, the placement, the angle, the track, the distance, and etc. of the body may be seen, and the motion status may be detected by the sensor(s) and transmitted to the control circuit module to data processing, wherein the data processing includes recording, comparing, analyzing, and etc. After data processing, the message (including path, placement, height, speed, pressure, hitting point, angle, track, distance, and etc.) may be transmitted to the wireless transmission receiving module (such as smart phone or portable computer) via the wireless transmission transmitting module with wireless transmission (such as RF or Bluetooth), and the data may be processed by App software and displayed on the wireless transmission receiving module to provide training for Coach and/or sportsman. Furthermore, it may be charged by wireless charging to prevent from powering exhaustion.

To achieve above objectives, a light emitting ball structure is provided and comprises: a body; a control circuit module, disposed inside the body; at least one sensor, electrically connected to the control circuit module and disposed inside the body to detect the motion status of the body and transmit to the control circuit module for data processing; at least one light emitting module, attached on an outer surface of the body and electrically connected to the control circuit module; a wireless charge receiving module, electrically connected to the control circuit module and disposed inside the body; a wireless charge transmitting module, disposed outside the body and actuating a charging operation of the wireless charge receiving module by wireless connection; a rechargeable battery, electrically connected to the control circuit module, the wireless charge receiving module, and the at least one light emitting module, the charging operation between the wireless charge transmitting module and the wireless charge receiving module is actuating to charge the rechargeable battery; a remote control receiving module, electrically connected to the control circuit module and disposed inside the body; and a remote control transmitting module, disposed outside the body and remote controlling the remote control receiving module to process a switch ON/OFF operation.

The structure is further comprising a wireless transmission receiving module disposed outside the body and a wireless transmission transmitting module disposed inside the body and electrically connected to the control circuit module, the wireless transmission transmitting module transmits the data transmitted by the at least one sensor to the control circuit module to data processing to the wireless transmission receiving module by wireless transmission.

Wherein the light emitting module is a plane cold light source.

Wherein the wireless charge transmitting module at least includes XKT-408A chip and T5335 chip.

Wherein the wireless transmission receiving module is a smart phone or a portable computer.

Wherein the wireless transmission between the wireless transmission transmitting module and the wireless transmission receiving module is RF or Bluetooth.

Wherein the at least one sensor is pressure sensor, Gyro sensor, or G-sensor.

Wherein the at least one light emitting module is flexible.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Figure 1:
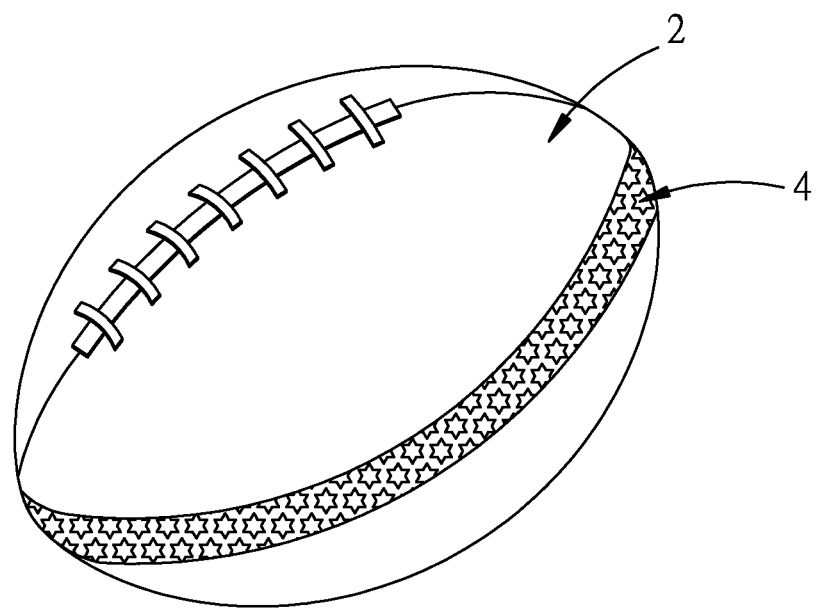
FIG. 1 is a schematic diagram of a light emitting ball structure according to an embodiment of present invention.

Referring now to the drawings where like characteristics and features among the various figures are denoted by like reference characters.

Figure 2:
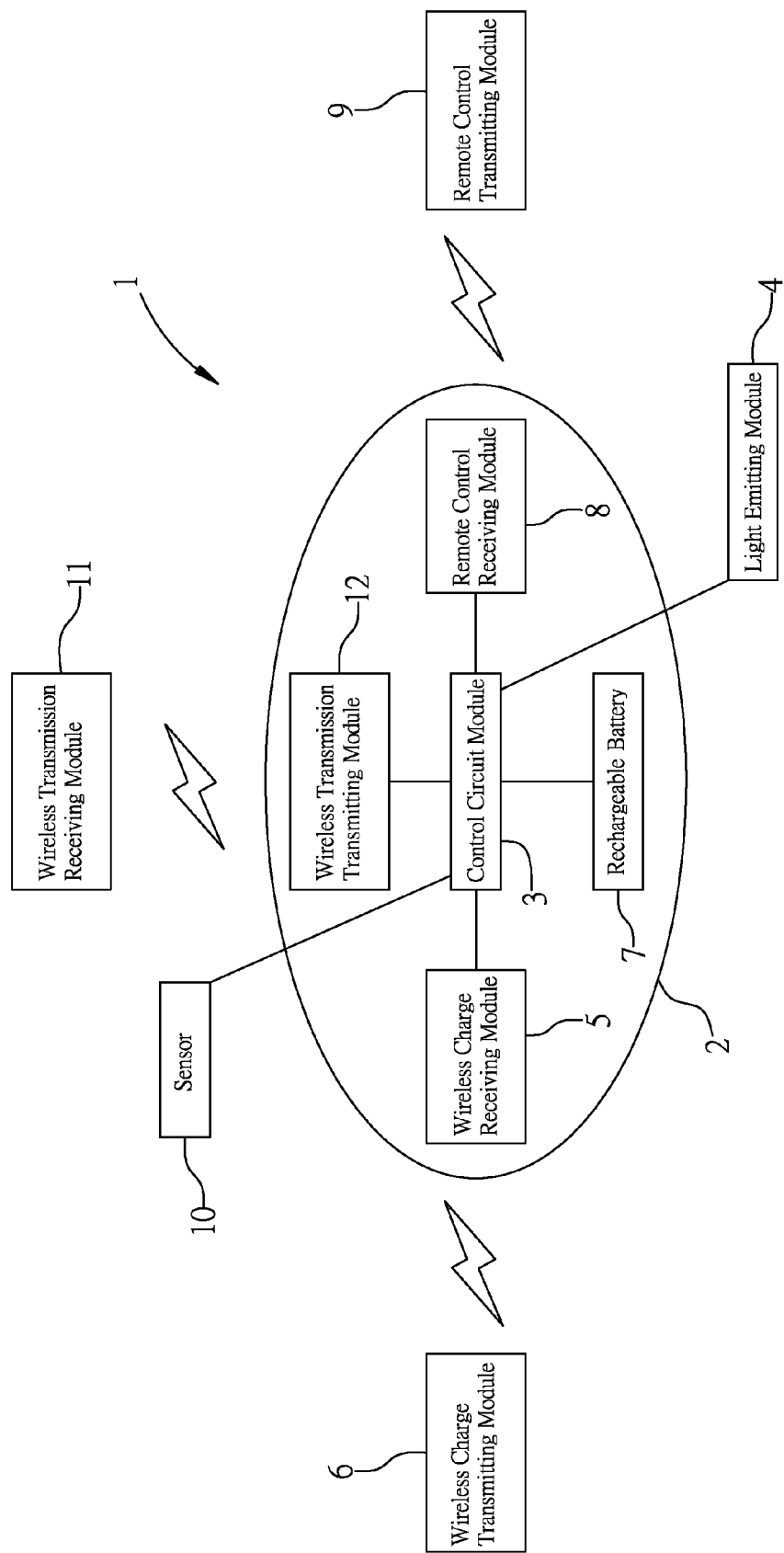
FIG. 2 is a block diagram of the light emitting ball structure according to an embodiment of present invention.

FIG. 1 is a schematic diagram of a light emitting ball structure according to an embodiment of present invention. FIG. 2 is a block diagram of the light emitting ball structure according to an embodiment of present invention.

Please refer to FIGS. 1 and 2, the light emitting ball structure 1 of this invention comprises a body 2, a control circuit module 3, a light emitting module 4, a wireless charge receiving module 5, a wireless charge transmitting module 6, a rechargeable battery 7, a remote control receiving module 8, a remote control transmitting module 9, and at least one sensor 10.

The body 2 may be a football shape, but not limited thereto.

The control circuit module 3 may be disposed inside the body 2.

The light emitting module 4 may be flexible, but not limited thereto. The light emitting module 4 may be single or multiple. The light emitting module 4 may be attached on an outer surface of the body and connected to the control circuit module 3. Each light emitting module 4 may include at least one plane cold light source, but not limited thereto. The plane light source may be composed of a phosphor isolator placed in between two conductors (electrodes). When the polarity of voltage between the two conductors changes, the phosphor powder may be lightened. Therefore, the voltage must be alternative current (AC), and the intensity of light is directly proportional to the amplitude and the frequency of the voltage.

Therefore, the Coach or the sportsman may definitely see the track, placement, and etc. of the body 2 through the light emitted from the light emitting module 4.

The number of the sensor 10 may be single one or multiple. The sensor 10 may be electrically connected to the control circuit module 3. The sensor 10 may be a pressure sensor, Gyro sensor, or G-sensor, but not limited thereto. If the number of the sensor 10 is multiple, they may be distributed at an inner surface of the body 2 to detect the hitting point attacked by the sportsman and transmit a message or signal to the control circuit module 3 to data processing.

The wireless charge receiving module 5 may be electrically connected to the control circuit module 3 and located inside the body 2. The wireless charge transmitting module 5 may be located outside the body 2 and actuating the wireless charge receiving to process the charging operation by wireless method.

Figure 5:
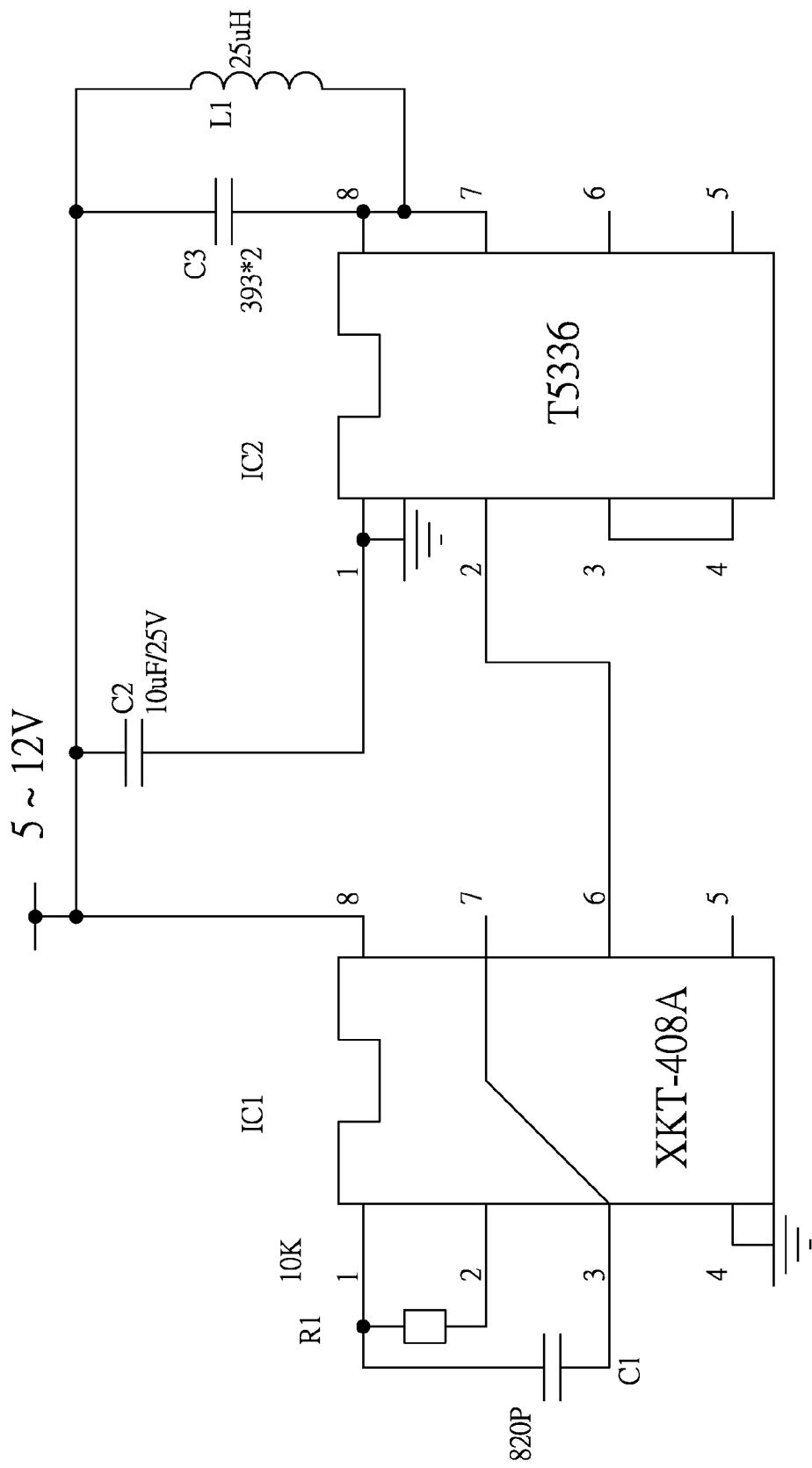
FIG. 5 is a circuit diagram of a wireless charge receiving module of the light emitting ball structure according to an embodiment of present invention.

Please refer to FIG. 5, the wireless charge receiving module 5 is composed of XKT-408A chip IC1, T5336 chip IC2, resistor R1 (the resistance may be 10KΩ), capacitor C1 (the capacitance may be 820 pF), capacitor C2 ((the capacitance may be 10 μF), capacitor C3 (393*2 μF), and inductor L1 (the inductance may be 25 μH).

The rechargeable battery 7 may be a Lithium battery, but not limited thereto. The rechargeable battery 7 may be electrically connected to the control circuit module 3. The rechargeable battery 7 may be charged through the charging operation of the wireless charge receiving module 5 actuated by the wireless charge transmitting module 6, and then the rechargeable battery 7 provides the power to the light emitting module 4 to emit light.

The remote control receiving module 8 may be connected to the control circuit module 3 and disposed inside the body 2. The remote control transmitting module 9 may be remote controlling the remote control receiving module 8 to process a switch ON/OFF operation, wherein the remote control transmitting module 9 may be a switch, but not limited thereto.

Figure 3:
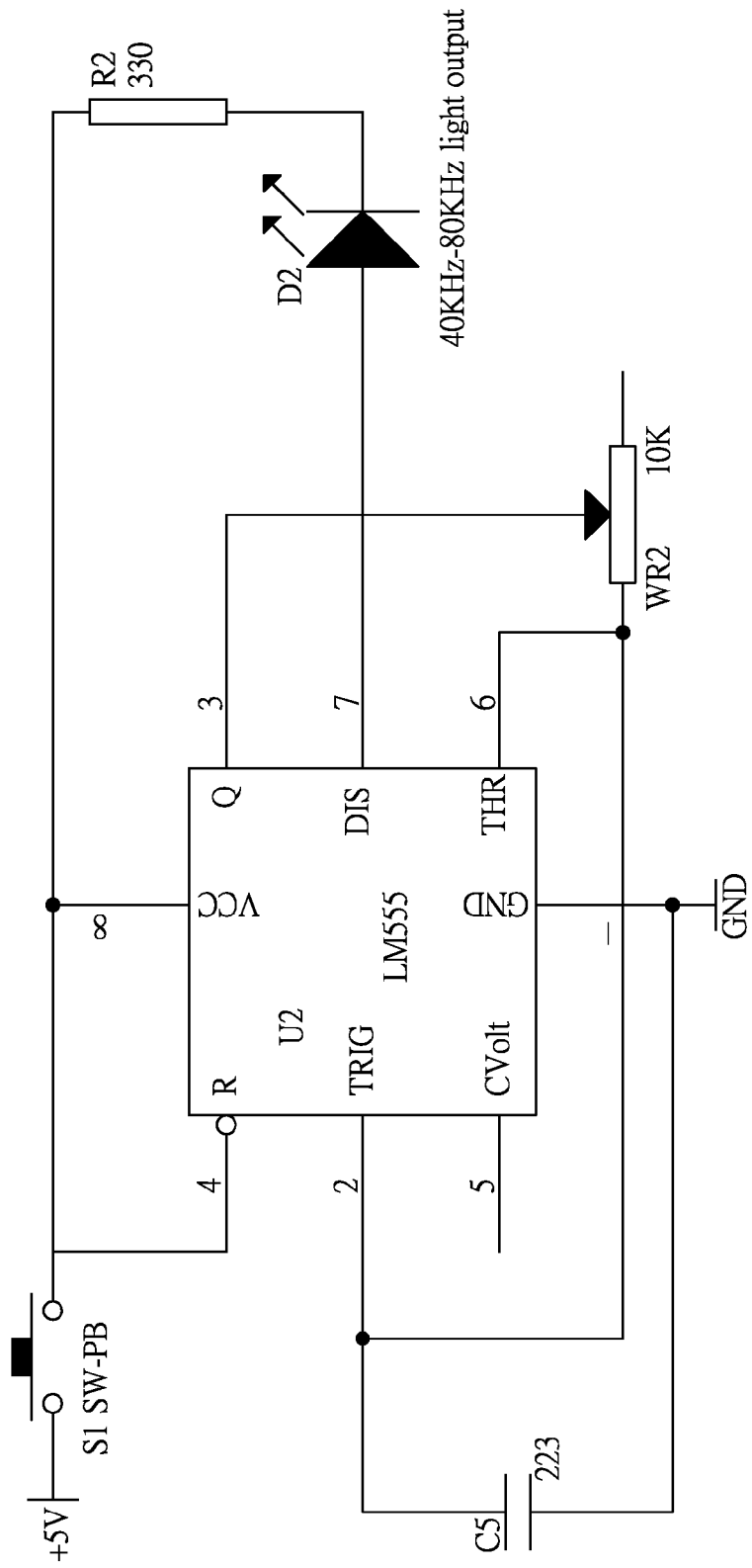
FIG. 3 is a circuit diagram of a remote control transmitting module of the light emitting ball structure according to an embodiment of present invention.
Figure 4:
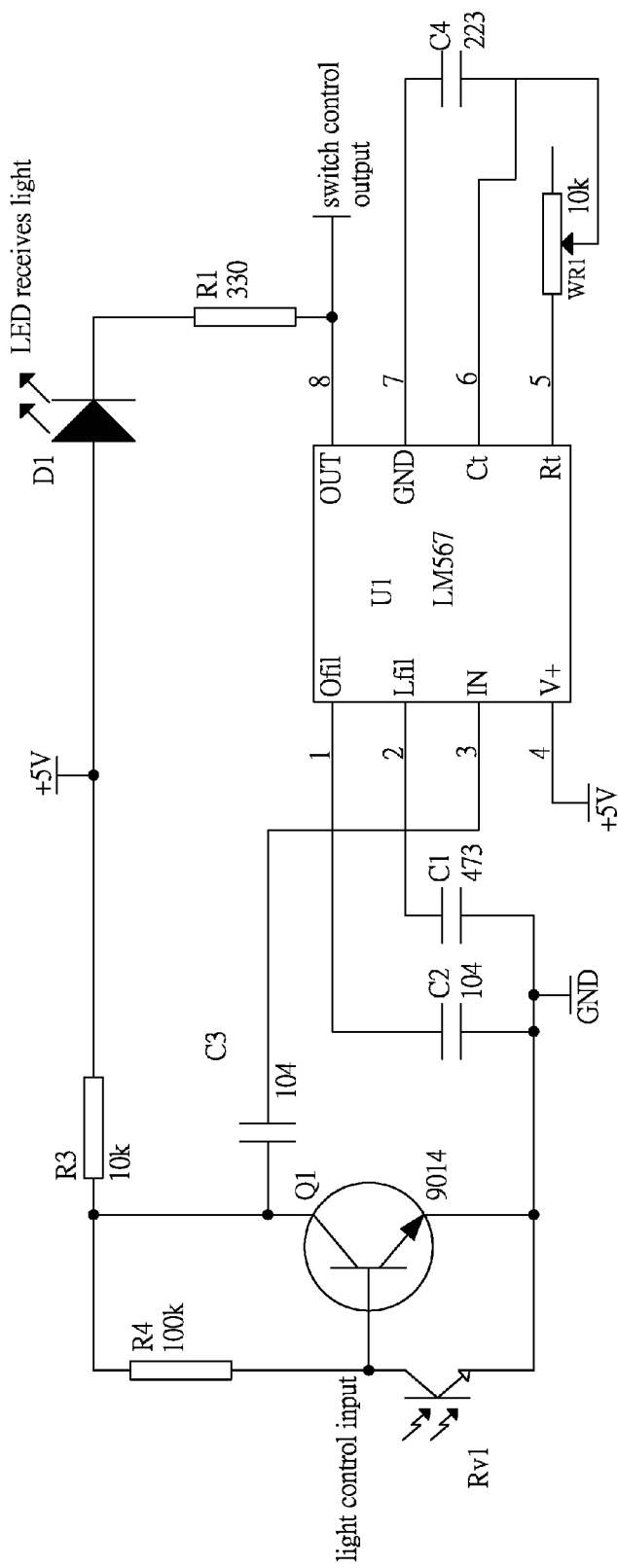
FIG. 4 is a circuit diagram of a remote control receiving module of the light emitting ball structure according to an embodiment of present invention.

Please refer to FIGS. 3 and 4, the remote control transmitting module 9 may be composed of LM555 chip U2, LED D2, switch S1, capacitor C5 (the capacitance may be 223 μF), resistor R2 (the resistance may be 330Ω), and variable resistor WR2 (the maximum resistance may be 10KΩ). And the remote control receiving module 8 may be composed of LM567 chip U1, LED D1, transistor Q1 and Rv1 (light control), capacitor C1 (the capacitance may be 473 μF), capacitor C2 (the capacitance may be 104 μF), capacitor C3 (the capacitance may be 104 μF), capacitor C4 (the capacitance may be 223 μF), resistor R1 (the resistance may be 330Ω), resistor R3 (the resistance may be 10KΩ), resistor R4 (the resistance may be 100KΩ), and variable resistor WR1 (the maximum resistance may be 10KΩ).

When the IC chip U1 is LM567, the eight pins are dual in-line package. The pins 5 and 6 may be electrically connected to a resistor R and a capacitor C (not shown) for deciding a center frequency $f0=1/1.1R*C$ of a voltage controlled oscillator inside a phase-locked loop. The capacitors connected to the ground of the pins 1 and 2 may respectively output filter network and single pole low-pass filter network of the phase-locked loop. The capacitance C11 of the capacitor C1 connected to the pin 2 may affect the bandwidth of the phase-locked loop, that the bandwidth $BW=1070(Vi/f0*C11)^2$ (percentage of F0), wherein Vi is the sine wave root mean square input voltage of pin 3, and the unit of Vi is mV and the unit of C11 is μF. The capacitance of the capacitor C2 connected to the pin 1 may at least twice of the capacitance of the capacitor C1 connected to the pin 2. The input signal of the pin 3 may be requested larger than 25 mV. The pin 8 is logic output terminal for allowing 100 mA maximum sink current. The working voltage of LM567 chip IC is 4.75~9V, the operating frequency is 500 KHz (max.), and the static working current is 8 mA.

When the input voltage of the pin 3 is larger than 25 mV and the frequency of the signal is in bandwidth, the logic output of the pin 8 is changed from high level to low level and the output of the pin 2 is through frequency/voltage switching audible signal. If an audible signal is inputted to the pin 2, the output of the pin 5 may be modulated to a wave modulated signal by the pin 2. Therefore, the LM567 chip IC may be used as modem.

The light emitting ball structure 1 may further comprise a wireless transmission receiving module 11 and a wireless transmission transmitting module 12. The wireless transmission receiving module 11 may be disposed outside the body and the wireless transmission transmitting module 12 may be disposed inside the body and electrically connected to the control circuit module 3. The wireless transmission transmitting module 12 transmits the data transmitted by the at least one sensor 10 to the control circuit module 3 to data processing to the wireless transmission receiving module 11 by wireless transmission. The wireless transmission between the wireless transmission receiving module 11 and the wireless transmission transmitting module 12 may be RF (radio frequency) or Bluetooth, but not limited thereto.

Therefore, the Coach may control the remote control receiving module 8 with the remote control transmitting module 9 to actuate the control circuit module 3. After the sportsman attacks the body 2, the Coach and/or the sportsman may see the light emitted by the light emitting module 4 to know the path, placement, hitting point, angle, track, distance, and etc., and detect the motion status of the body 2 by the at least one sensor 10 and be transmitted to control circuit module 3 to data processing. The data processing includes recording, comparing, analyzing, and etc. After data processing, the message (including path, placement, height, speed, pressure, hitting point, angle, track, distance, and etc.) may be transmitted to the wireless transmission receiving module 11 (such as smart phone or portable computer) via the wireless transmission transmitting module 12 with wireless transmission (such as RF or Bluetooth), and the data may be processed by App software and displayed on the wireless transmission receiving module 11 to provide training for Coach and/or sportsman. Furthermore, it may be charged by wireless charging to prevent from powering exhaustion.

What is claimed is:

1. A light emitting ball structure, comprising:
   a body;
   a control circuit module, disposed inside the body;
   at least one sensor, electrically connected to the control circuit module and disposed inside the body to detect the motion status of the body and transmit to the control circuit module for data processing;
   at least one light emitting module, attached on an outer surface of the body and electrically connected to the control circuit module;

a wireless charge receiving module, electrically connected to the control circuit module and disposed inside the body;

a wireless charge transmitting module, disposed outside the body and actuating a charging operation of the wireless charge receiving module by wireless connection;

a rechargeable battery, electrically connected to the control circuit module, the wireless charge receiving module, and the at least one light emitting module, the charging operation between the wireless charge transmitting module and the wireless charge receiving module is actuating to charge the rechargeable battery;

a remote control receiving module, electrically connected to the control circuit module and disposed inside the body;

a remote control transmitting module, disposed outside the body and remote controlling the remote control receiving module to process a switch ON/OFF operation; and a wireless transmission receiving module disposed outside the body and a wireless transmission transmitting module disposed inside the body and electrically connected to the control circuit module, the wireless transmission transmitting module transmits the data transmitted by the at least one sensor to the control circuit module to data processing to the wireless transmission receiving module by wireless transmission.

2. The structure as claimed in claim 1, wherein the light emitting module is a plane cold light source.

3. The structure as claimed in claim 1, wherein the wireless charge transmitting module at least includes XKT-408A chip and T5335 chip.

4. The structure as claimed in claim 1, wherein the wireless transmission receiving module is a smart phone or a portable computer.

5. The structure as claimed in claim 1, wherein the wireless transmission between the wireless transmission transmitting module and the wireless transmission receiving module is RF or Bluetooth.

6. The structure as claimed in claim 1, wherein the at least one sensor is pressure sensor, Gyro sensor, or G-sensor.

7. The structure as claimed in claim 1, wherein the at least one light emitting module is flexible.

\* \* \* \* \*